US006985810B2

(12) United States Patent
Moitra et al.

(10) Patent No.: US 6,985,810 B2
(45) Date of Patent: Jan. 10, 2006

(54) REAL-TIME ROUTE AND SENSOR PLANNING SYSTEM WITH VARIABLE MISSION OBJECTIVES

(75) Inventors: Abha Moitra, Westwood, MA (US); Robert M. Mattheyses, Schenectady, NY (US); Robert J. Szczerba, Endicott, NY (US); Louis J. Hoebel, Burnt Hills, NY (US); Virginia A. Didomizio, Latham, NY (US); Boris Yamrom, Bronx, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 69 days.

(21) Appl. No.: 10/628,923

(22) Filed: Jul. 29, 2003

(65) Prior Publication Data

US 2004/0073341 A1    Apr. 15, 2004

Related U.S. Application Data

(62) Division of application No. 10/079,959, filed on Feb. 21, 2002, now Pat. No. 6,725,152.

(51) Int. Cl.
*G01C 21/00* (2006.01)
*G06F 17/00* (2006.01)
(52) U.S. Cl. .......................................... 701/202; 701/1
(58) Field of Classification Search ................ 701/200, 701/202, 208, 209; 340/988
See application file for complete search history.

(56) References Cited

U.S. PATENT DOCUMENTS

| | | |
|---|---|---|
| 4,323,880 A | 4/1982 | Lucas |
| 4,814,711 A | 3/1989 | Olsen et al. |
| 4,868,755 A | 9/1989 | McNulty et al. |
| 4,984,168 A | 1/1991 | Neukrichner et al. |
| 5,083,256 A | 1/1992 | Trovato et al. |
| 5,187,667 A | 2/1993 | Short |
| 5,204,817 A | 4/1993 | Yoshida |
| 5,247,356 A | 9/1993 | Ciampa |
| 5,268,698 A | 12/1993 | Smith, Sr. et al. |
| 5,458,490 A | 10/1995 | Cabana |
| 5,481,479 A | 1/1996 | Wight et al. |
| 5,497,157 A | 3/1996 | Gruener et al. |
| 5,629,626 A | 5/1997 | Russell et al. |
| 5,631,640 A | 5/1997 | Deis et al. |
| 5,636,123 A | 6/1997 | Rich et al. |
| 5,638,282 A | 6/1997 | Chazelle et al. |
| 5,646,844 A | 7/1997 | Gudat et al. |
| 5,668,717 A | 9/1997 | Spall |
| 5,712,788 A | 1/1998 | Liaw et al. |
| 5,731,978 A | 3/1998 | Tamai et al. |
| 5,751,576 A | 5/1998 | Monson |
| 5,790,123 A | 8/1998 | Wald et al. |
| 5,815,417 A | 9/1998 | Orr et al. |
| 5,838,262 A | 11/1998 | Kershner et al. |
| 5,883,586 A | 3/1999 | Tran et al. |

(Continued)

*Primary Examiner*—Yonel Beaulieu
(74) *Attorney, Agent, or Firm*—Tarolli, Sundheim, Covell & Tummino L.L.P.

(57) ABSTRACT

A method routes an entity (200) through a predetermined area for scanning the content of the predetermined area. The method comprises the steps of: partitioning the predetermined area into cells (100); determining a starting cell for the entity (200); initiating a scan of a number of the cells from the starting cell and determining the content of each of the number of cells; and determining a total cost for the entity (200) to travel to each of the scanned cells and to perform a scan from each of the scanned cells.

7 Claims, 3 Drawing Sheets

U.S. PATENT DOCUMENTS

| | | |
|---|---|---|
| 5,884,223 A | 3/1999 | Tognazzini |
| 5,892,462 A | 4/1999 | Tran |
| 5,899,955 A * | 5/1999 | Yagyu et al. ............... 701/209 |
| 5,928,294 A | 7/1999 | Zelinkovsky |
| 5,999,881 A | 12/1999 | Law et al. |
| 6,038,509 A | 3/2000 | Poppen et al. |
| 6,047,234 A | 4/2000 | Cherveny et al. |
| 6,076,042 A | 6/2000 | Tognazzini |
| 6,085,147 A | 7/2000 | Myers |
| 6,092,009 A | 7/2000 | Glover |
| 6,122,572 A | 9/2000 | Yavnai |
| 6,128,574 A | 10/2000 | Diekhans |
| 6,134,500 A | 10/2000 | Tang et al. |
| 6,148,259 A | 11/2000 | Hagelauer |
| 6,167,331 A | 12/2000 | Matsumoto et al. |
| 6,169,981 B1 | 1/2001 | Werbos |
| 6,173,219 B1 | 1/2001 | Deker |
| 6,175,802 B1 | 1/2001 | Okude et al. |
| 6,175,804 B1 | 1/2001 | Szczerba |
| 6,182,007 B1 | 1/2001 | Szczerba |

* cited by examiner

REAL-TIME ROUTE AND SENSOR PLANNING SYSTEM WITH VARIABLE MISSION OBJECTIVES

This application is a divisional of application Ser. No. 10/079,959, now U.S. Pat. No. 6,725,152, filed on Feb. 21, 2002.

FIELD OF THE INVENTION

The present invention relates to a system for routing a sensor through a predefined area and, more particularly, to a system for scanning a target portion of the predefined area.

BACKGROUND OF THE INVENTION

Various operations are becoming increasingly dependent on intelligent systems to guide the planning and execution of critical mission tasks. Planning missions by hand, or by large, ground-based computer systems is rapidly becoming obsolete in a world in which rapid access to information is almost as important as physical capability. One of the critical planning tasks involves the real-time route and sensor planning for a variety of mission scenarios. The missions may be military or civil and take place on land, sea or in the air. Developing algorithms and architectures to solve these problems is a rapidly growing area of interest. Once a large enough portion of an area has been scanned by a sensor equipped entity, other entities may enter the area and perform their various functions.

One of the main components of such planning operations involves the development of accurate and efficient route and sensor planning algorithms. Such planning operations include, but are certainly not limited to, reconnaissance and surveillance operations. These planning operations are needed for a variety of platforms including air, naval, ground, and various tactical combinations of all three.

Finding solutions to these planning problems is very difficult and can determine the difference between success and failure of the mission. It is unlikely that there will be expedient solutions for this class of problems. Thus, heuristic approaches are used to generate efficient solutions in real-time that are as good or better than a human could generate. Only limited research has been conducted for solving these types of problems.

SUMMARY OF THE INVENTION

In accordance with one aspect of the present invention, a method routes an entity through a predetermined area for scanning the content of the area. The method comprises the steps of: partitioning the predetermined area into cells; determining a starting cell for the entity; initiating a scan of a number of the cells from the starting cell and determining the content of each of the number of cells; and determining a total cost for the entity to travel to each of the scanned cells and to perform a scan from each of the scanned cells.

In accordance with another aspect of the present invention, a system scans a target portion of a predefined search area. The system includes a sensor for scanning a first part of the predefined search area and a device for analyzing output from the sensor and determining a destination within the predefined area for the sensor. The sensor scans a second part of the predefined search area from the destination. The first part and the second part together comprise a part of the predefined search area at least as large as the target portion of the predefined search area.

In accordance with still another aspect of the present invention, a computer program product determines a route for an entity through a predetermined area and analyzes the content of the predetermined area. The product includes four procedures. The first procedure partitions the predetermined area into cells. The second procedure determines a starting cell for the entity. The third procedure initiates a scan of a number of the cells from the starting cell and determines the content of each of the number of cells. The fourth procedure determines a total cost for the entity to travel to each of the scanned cells and for performing a scan from each of the scanned cells.

In accordance with yet another aspect of the present invention, a computer program product includes a computer readable medium and a computer program stored by the computer readable medium. The computer program includes the following instructions: a first instruction for partitioning the predetermined area into cells; a second instruction for determining a starting cell for the entity; a third instruction for initiating a scan, from the starting cell, of a number of the cells and determining the content of each of the number of cells; a fourth instruction for determining a total cost for the entity to travel to each of the scanned cells and for performing a scan from each of the scanned cells.

BRIEF DESCRIPTION OF THE DRAWINGS

The foregoing and other advantages of the invention will become more readily apparent from the following description of a preferred embodiment of the invention as taken in conjunction with the accompanying drawings, which are a part hereof, in which.

DESCRIPTION OF AN EXAMPLE EMBODIMENT

In accordance with an example embodiment of the present invention, before an area may be entered by friendly forces, the safety of the area must be determined by scanning the area. The scanning is achieved by the routing of a sensor, and its associated entity, through the area to be scanned. Some examples of the entity may be a car, a truck, a boat, an airplane, some other appropriate vehicle or even a person. Route and sensor planning for reconnaissance and surveillance missions is an extremely complex problem.

To simplify the problem, route planning and sensor planning are typically done independently leading to the following two standard approaches: Scan First, where acceptable scan points are predetermined and then a path for the entity is planned connecting the scan points; and Path First, where a route plan for the entity is generated and then sensor scans are opportunistically inserted at locations along the path of the entity.

A generated solution typically must meet the stated area coverage objectives (i.e., a minimal percentage of the area must be scanned and thereby determined safe). Furthermore, the generated solution should meet this objective with a low overall associated cost (related to the amount of threat exposure in performing a particular mission), while satisfying a variety of efficiency, doctrine, and aesthetic requirements, as follows: cost of the generated solution, the exposure to enemy threat locations encountered when following the generated route and sensor plan; efficiency, time to generate the route and sensor plan (typical efficiency requirements rule out an exhaustive search of the area to be scanned, especially when considering real-time computations); doctrine, safety considerations— for example a sensor scan may only be performed from safe points (sensor locations which have been previously scanned by friendly forces and/or the entity and are known to be free of threats; the path between scan points should also be safe); and aesthetics, the generated plan should avoid loops, excessive backtracking, and unnecessary zigzag segments.

In a Scan First approach, the overall cost may be very large while in the Path First approach the target coverage may not be met. In both of these approaches, it is difficult to directly factor in efficiency, doctrinal, and aesthetic considerations. While some post-processing is possible, the only way to achieve the coverage objective with low cost and high efficiency, and also doctrine and aesthetic considerations, is to intelligently integrate the route and sensor planning of both approaches.

Figure 1:
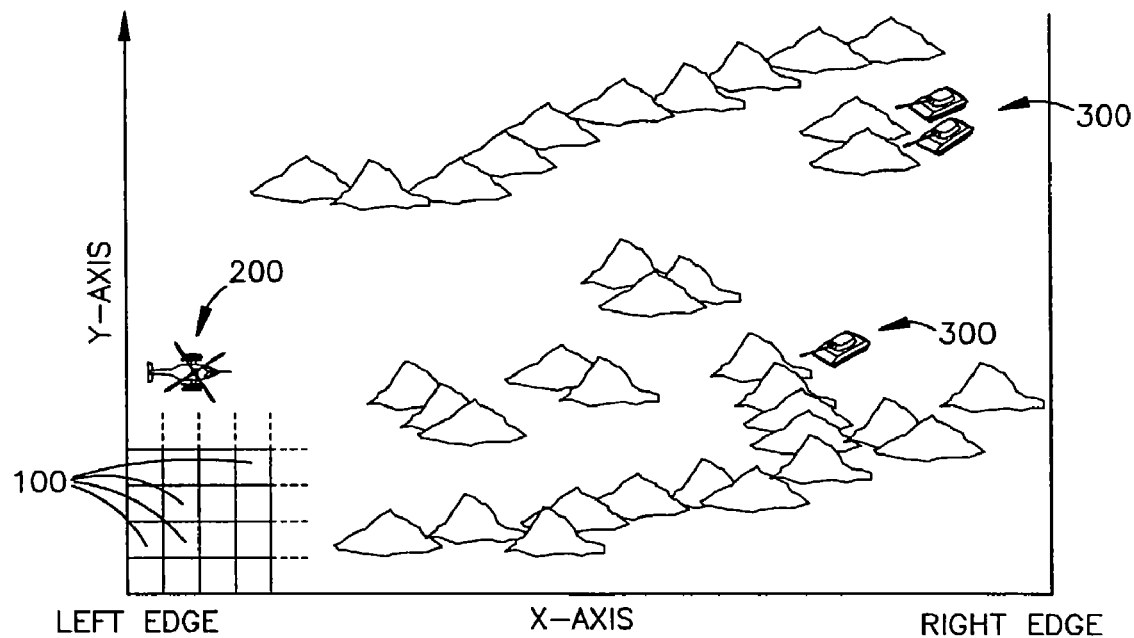
FIG. 1 is a schematic plan view of a search area for use with the present invention.

In accordance with the present invention, integrated route planning and sensor planning for reconnaissance and surveillance missions may be termed the MissionPlanning algorithm, or developing a MissionPlan. A schematic plan view of MissionPlanning is illustrated in FIG. 1. Any solution to the MissionPlanning problem meeting the stated objectives must be evaluated by the following two criteria: the time required to generate a solution and the quality of the solution generated. The problem is complicated in two ways: (1) by the intrinsic computational complexity of the underlying optimization problem; and (2) by details introduced by the real-world application domain.

A mission planner, such as a person or a computer, must deal with competing objectives with relative degrees of importance that can differ from one problem instance to the next (i.e., different data sets, etc.). In addition, not all of the objectives lend themselves to quantification. For example, the path should not have too many zigzag segments. Thus, heuristic approaches are suggested to solve the MissionPlanning problem. The mission planner may be located at any communication linked location. In accordance with an example embodiment of the present invention, the general mission scenario and the definitions needed for specifying one MissionPlanning problem and its solution are described below.

As viewed in FIG. 1, the geographic area to be searched may be partitioned into a cell grid 100. The cell grid 100 may be modeled by an algorithm that is operated by a sufficiently equipped computer. The cells of the grid 100 are typically non-overlapping and square regions covering the entire area to be searched. Two attributes, Elevation and MapCost, characterize each cell. Elevation has the obvious definition and is treated as constant over the area covered by each cell (generally the average elevation value of the indicated cell). MapCost represents the danger or cost associated with visiting the cell, by traveling through the cell and scanning from the cell. MapCosts are non-negative real numbers. Higher values of MapCost indicate areas of increased danger. An infinite MapCost value represents a forbidden region (i.e., a lake that is not traversable by a land search vehicle). MapCost depends on mission type, search entity type, terrain of the grid 100, and other features. For this example, MapCost is predetermined as input data.

The search entity 200 is characterized by its speed of travel and a fixed scan altitude above ground level (scan AGL), from which scan operations are performed. The scan AGL may be assumed to be constant throughout a mission. When the search entity 200 is a helicopter, this abstraction does not restrict the height at which the helicopter travels, but may instead conform to the practice of "popping up" to do a scan for enemy entities 300 or other dangers in the grid 100 and then returning to a predetermined mission altitude. Speed of traversal is also typically fixed for the entity 200.

Figure 2:
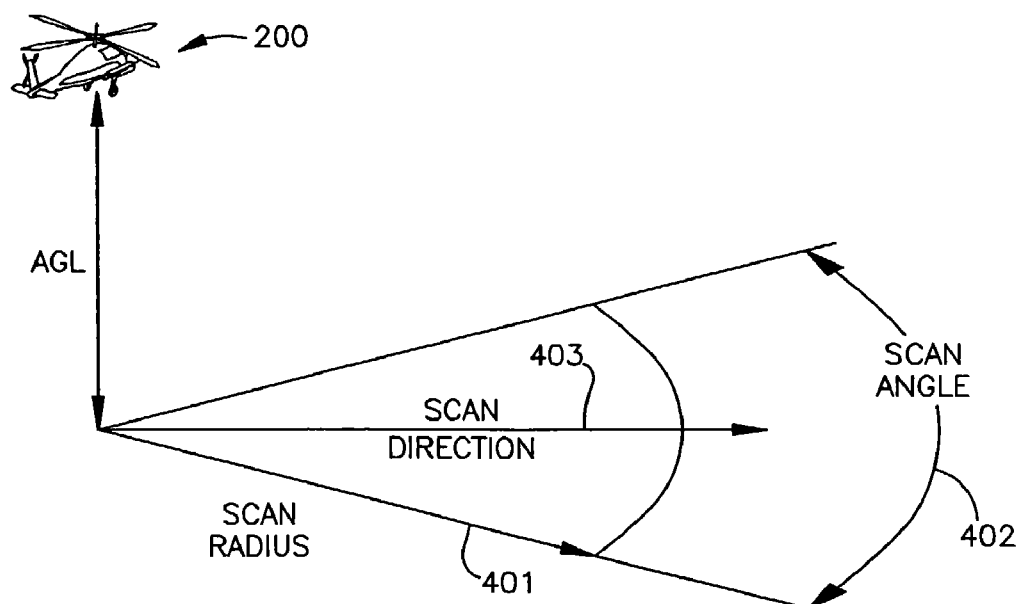
FIG. 2 is a schematic perspective view of a scan operation for use with the present invention.

The entity 200 carries a sensing device, or sensor, which is used to do the "looking", or scanning. The sensor may use infrared, radar, ultrasonic, etc. sensing technology. The sensor is characterized by a scan radius 401 (the distance limit of a scan operation), scan arc, or scan angle 402 (the footprint of the scan operation), scan direction 403 (the center of the scan angle at the time a scan is executed), and scan time. Scan time is the time required to perform a single scan operation. The sensor's capabilities are typically assumed to be constant for the duration of a mission. A schematic of a typical scan operation is illustrated in FIG. 2.

The mission objective is typically defined as Target Coverage, the percentage of the region that must be scanned during the mission. Values of Target Coverage usually range from 60% to 80%. In this example, the given mission area to be traversed starts at a left border and proceeds to a right border, as illustrated in the plan view of FIG. 1.

The MissionPlan consists of sequences of scan points 501 for the entity 200. A scan point 501 corresponds to the center point of a particular subgrid (5 by 5 in FIG. 3). Each scan point 501 is identified by its location (grid point), scan AGL, and scan direction. A cell is considered scanned if it is less than the scan radius distance from the scan point and is visible from the AGL above the scan point (i.e., within range of the sensor and visible to the entity 200). The order of the scan points 501 in a sequence defines a traversal of the region by the scanning entity 200. It is assumed that the entity 200 travels in a straight-line path between successive scan points, though any route planning algorithm may be used.

Doctrine may specify additional objectives and constraints on the MissionPlan. Personnel safety and entity safety may be critical issues, especially in applications that involve travel through hostile environments. Thus, doctrine may specify that scans can only be performed from safe cells. As viewed in FIG. 3, a cell 501 may be considered safe if it has been previously scanned and all its eight neighbors 502 have been scanned. One exception may relax this adjacency condition for cells that are on ridges.

A path (such as a straight line) between two scan points is considered safe if all the cells that the path intersects have been previously scanned. This constraint may be treated as soft with the degree of criticality determined by the user at run time. Treating it as a hard constraint could lead to blocked missions in certain situations. In addition, there are aesthetic requirements, such as avoiding loops (self-intersecting paths), excessive backtracking, and unnecessary zigzag segments, which need to be considered in the final solution.

MissionPlanning is a very dynamic process. MissionPlans often need to be planned and re-planned quickly as situations change (i.e., movement of enemy entities 300 during the mission). The speed with which MissionPlans can be generated is another critical factor of any solution. Replanning, which may take place during the mission execution itself, must be even faster.

As mentioned above, the MissionPlanning algorithm may be a greedy algorithm where the entity 200 selects the best next scan point from a set of potential next scan points without "look ahead". The set of potential, or candidate, next scan points consist of all points that have been previously scanned which are interior to (not on the border of) the scanned area plus all ridge points that have been previously scanned. From this set, candidate next scan points that do not meet the pro-rated target coverage are discarded, as described below. For the remaining candidate next scan points, their value is determined by a tradeoff between cost and benefit. In its simplest form, the cost is the cost of traveling to the next scan point (from the current scan point) and the cost of performing the scan at the next scan point. The benefit is based on the number of new cells able to be scanned from the next scan point.

Since the algorithm does not use "look ahead", and actual backtracking (moving in the negative x direction) is undesirable, it is necessary to assure during the scan that the scanned region covers the area sufficiently densely. Target Coverage (as defined above) is a simple concept at the completion of a mission. It is simply: # of cells scanned/# cells in the area. Likewise, Local Target Coverage (for an individual scan) can be defined for any area A as: # scanned cells in A/# cells in A.

"A" must be properly defined so that the MissionPlan is kept on track for meeting the Target Coverage by the time the right border is encountered (FIG. 1). Two definitions of A may yield two different approximations of Local Target Coverage. These are: (1) base Local Target Coverage on the x-coordinate of the scan point; or (2) base Local Target Coverage on the x-coordinate of rightmost cell scanned by the entity 200. The first definition above typically performs better when the Target Coverage is high (i.e., 80%).

The tradeoff between cost and benefit is typically a complex analysis. The cost component depends on the MapCost values assigned to grid cells for which there is no a priori limit. Similarly, the benefit component depends on the number of new cells scanned, which in turn depends on the scan radius, scan angle, scan AGL, and scan direction. To limit this complexity, the following control parameters may be defined.

PathWeight is a parameter by which the MapCost of each grid cell on the path is algebraically transformed (i.e. multiplied) to obtain the cost of traveling to the next scan point. Typically this parameter is 1, in which case the internal algorithmic path cost matches the external path cost of the MissionPlan.

ScanWeight is a parameter by which the MapCost of the next scan point is algebraically transformed (i.e. multiplied) to obtain the cost of performing the scan. This value reflects the time needed for performing the scan so as to quantify the exposure cost to the entity 200. If the scan angle is 30° and the time required to perform a 30° scan is twice the time needed to traverse a grid 100, then this parameter may be set at 2.

RepeatWeight is a parameter by which the number of rescanned cells is algebraically transformed (i.e. multiplied) to obtain the cost of repeating the scan. All other parameters being equal, the number of cells that are being rescanned should be as little as possible. The value of this parameter may be 1.

UnsafePath Weight is parameter by which the number of unscanned cells in the path is algebraically transformed (i.e. multiplied) to obtain the cost of traversing an unscanned area in order to reach the next scan point. This factor penalizes the traversing of an unscanned area (which is generally undesirable).

NewCellWeight is a parameter by which the number of new cells scanned is algebraically transformed (i.e. multiplied) to obtain the cost of the scan from the next scan point. The number of new cells scanned is considered a benefit (hence the value of this parameter is negative). This parameter may be extremely critical since it must offset the cost and the cost has no a priori limit, as described above. A candidate next scan point is discarded if no new cells can be scanned from it. This discarding not only ensures that progress is made, but also allows the algorithm to terminate when no further progress can be made (i.e., when parameter settings are unreasonable).

When the Target Coverage for the MissionPlan has been achieved, the algorithm may choose to have the entity 200 move out of the area (to the right edge). This aspect may be altered to suit specific mission needs.

Selection of scan points is generally restricted to safe cells and scanned ridge cells (as mentioned earlier, a safe cell is one that along with its eight neighbors has been previously scanned). To comply with this restriction, at the start of the algorithm the leftmost edge of the search region (3 cells wide) is marked as already scanned,. In a real mission this would correspond to a safe "staging-area", where the entity 200 can scan into a desired search area to determine a safe point of entry. This allows a non-null initial set of candidate next scan points. This leftmost strip of already scanned cells, or safe frontier, does not contribute towards Target Coverage even if some of these cells are scanned later. While this may undercount the number of cells scanned, it allows for a uniform and simple counting of scanned cells in the algorithm.

A single scan operation may determine safe cells, safe front cells, and boundary cells. The number of each of these types of cells determined in a single scan operation is dependent upon the ability and utilization of the sensor (i.e., scan radius 401, scan direction 403, scan angle 402, etc.).

Initiating the algorithm with the safe frontier also implies that the calculation of the Target Coverage in the previous section must be adjusted accordingly. Ridges often limit scanning, thus they are likely to be on the boundary of the set of scanned cells. This would normally make them ineligible as cells from which to perform scans. This situation could lead to blocking, leaving a scanning entity with no safely reachable safe next scan points. To avoid this situation and to include behavior from real missions, ridge cells may be included into the set of candidate next scan points even if they are on the boundary. Thus, the algorithm may select a cell as a next scan point from the boundary of the scanned cells, as long as that cell is a ridge cell.

Figure 3:
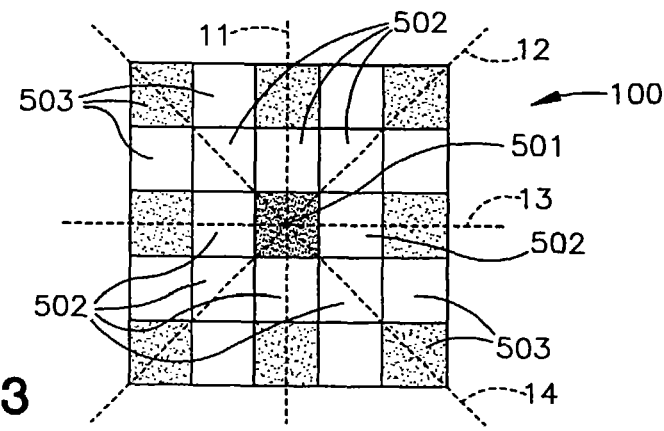
FIG. 3 is a schematic plan view of a sample grid of cells for use with the present invention.

The determination of ridge cells for the entire area is done as a pre-processing step by the algorithm. A simple computation is used to identify ridge cells. A cell is on a ridge if along some direction the cells on both sides are lower. To translate this definition to the grid 100, four directions 11, 12, 13, 14 may be used, as indicated in FIG. 3. If the cells along a single line 11, 12, 13, or 14 on both sides of the center cell 501 are lower than the center cell by more than a threshold amount, the center cell is labeled as a ridge. Typically the threshold amount used is the scan AGL. A 5 by 5 grid (FIG. 3) typically yields better results than a 3 by 3 grid, while not significantly increasing the computation time.

The flexibility of the MissionPlanning algorithm allows the introduction of the following two additional control parameters. CircularSearchBound quantifies how far backward the entity 200 can travel to the next scan point from the current scan point, typically specified as a fraction of scan radius 401. This effectively limits the amount of backtracking permitted for travel to the next scan point. BackwardSearchBound quantifies how far back the entity 200 can travel from the outermost point the entity has scanned, specified in number of cells. This effectively provides a sliding window from which the next scan point is selected. It also ensures that the maximum number of candidate next scan points is bounded no matter how long the search area becomes. These two control parameters limit the amount of backtracking permitted and hence improve both the algorithm efficiency as well as the quality of the MissionPlan generated.

A major component of the algorithm running time consists of the continual running of a line of sight sub-routine to determine the coverage that a candidate next scan point might provide if selected as the next scan point. Any scanned cell (not on the boundary) and scanned ridge cell may comprise a set of candidate next scan points. This set may be very large. Limiting the size to a more practical/workable subset is critical to the time performance of the algorithm. The subset selection process includes the following: (1) limiting candidate next scan points to be just inside the boundary already scanned plus the scanned ridge cells on the boundary; (2) limiting backtracking via the parameter CircularSearchBound; (3) using a "fixed size" sliding window from which candidate next scan points can be selected via the parameter BackwardSearchBound; and (4) further subsampling candidate next scan points since neighboring points typically have similar cost and benefit. A parameter, SparsenessFactor, may be used to avoid needlessly considering candidate next scan points that are close together. A deterministic technique (for repeatability of testing) or a random sampling may be used.

All these techniques contribute to achieving a time efficient algorithm, able to generate high quality MissionPlans for a wide variety of missions. Below is an example of one possible algorithm:

Algorithm: MissionPlanning
Input: Search Area, specified as a grid of cells with MapCost and Elevation.
Goal: Target Coverage, percentage area to be scanned.
Output: Scan List, an ordered list of <p, d>, where p is a scan point and d is a scan direction; Percentage, percentage of Search Area scanned.

DEFINITIONS

Scanned(c): True iff cell c has been scanned.
Safe(c): True iff Scanned(c) and all 8 neighbors of c have been scanned.
Boundary(c): True iff Scanned(c) and c is adjacent some unscanned cell.
SafeFront(c): True iff Safe(c) and c is adjacent a boundary cell.
Ridge(c): True iff, along some direction, the cells on both sides have lower AGL than AGL of c.

1. Initialization: Establish a safe starting edge for the entity by marking all cells in the 3 leftmost columns as Scanned, set entity's current position to be the middle cell c in the $2^{nd}$ leftmost column.
2. Identify candidates for next scan point:
   a. Define Candidate Scan Point, CSP= {p|SafeFront(p) or (Boundary(p) and Ridge (p))}
   b. if SparsenessFactor=q, then retain every qth element in the above set
   c. prune CSP further by discarding all scan points that are not within CircularSearchBound * Scan Radius of entity's current position
   d. prune CSP by discarding all scan points that are not within BackwardSearchBound of the x coordinate of the rightmost scanned cell.
   e. if CSP is an empty set, then terminate algorithm (as no candidates for scan points remain).
3. Define scan candidate set S={<p, d>|p in CSP and d in allowed scan directions}.
4. For each scan candidate <p, d>in S, determine its cost Cost (<p, d>) as follows:
   a. Define Count to be the number of newly scanned cells from scan <p, d>.
   b. Cost (<p, d>)=ScanWeight * MapCost(p)+PathWeight * sum of MapCost of cells on straight line path from entity's current position to p+UnsafePathWeight * number of unscanned cells in straight line path from entity's current position to p+RepeatWeight * number of repeat cells scanned due to scan <p, d>+NewCellWeight * Count.
   c. Define A to be total number of cells scanned, including from <p, d>, but not on left edge.
   d. Define B to be (x coordinate of p) * number of vertical cells in Search Region.
   e. If A/B<TargetCoverage or Count=0, then set Cost(<p, d>) to infinity.
5. Select <p,d> with minimum Cost from S; append this to Scan List.
6. Perform the selected scan from <p, d> by updating entity's current position, percentage area scanned, scanned cells, and safe frontier cells.
7. Repeat steps 2 through 6 if percentage area scanned is less than the goal, Target Coverage.

The MissionPlanning algorithm has been conducted on various subsets of a large area. The entire data set was for a 100 km×100 km area. Each grid cell was 100 m×100 m. Each scan was performed on a rectangular subgrid, typically 300 cells by 100 cells.

The MissionPlanning system is an accurate, time efficient, and robust algorithm for real-time route and sensor planning applications. The ability to handle a wide range of target coverage goals during the planning process makes the algorithm valuable for a wide range of reconnaissance and surveillance applications. The uniqueness of the system is the ability to integrally adhere to mission doctrine and allow very fine control over the tradeoffs between cost, benefit, efficiency, and aesthetics in generating route and sensor plans. The algorithm may be applied to a number of other domains by simply varying the parameters used to compute the cost values in the map.

Figure 4A:
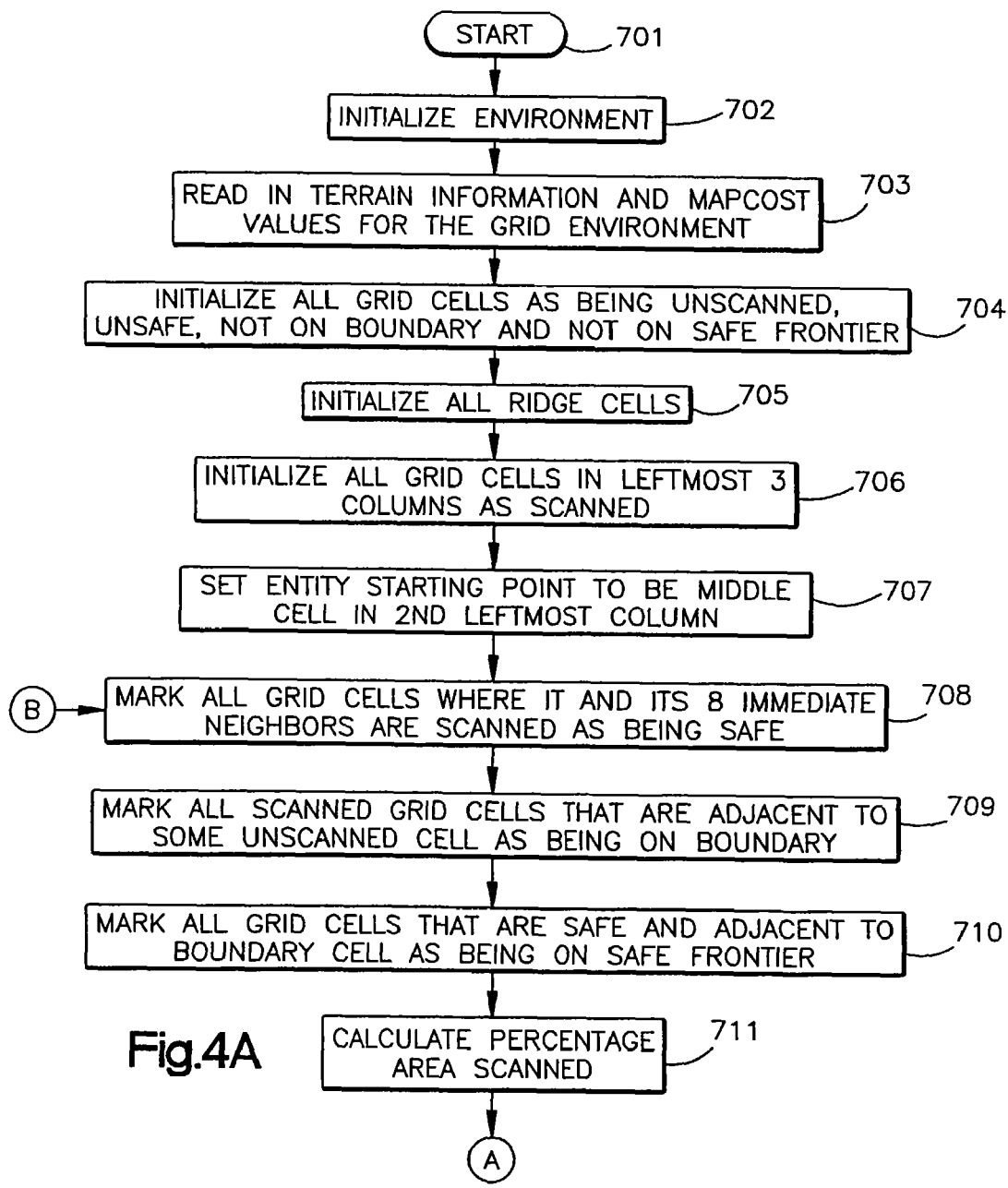
FIGS. 4A and 4B are a schematic block diagram of one algorithm for use with the present invention.
Figure 4B:
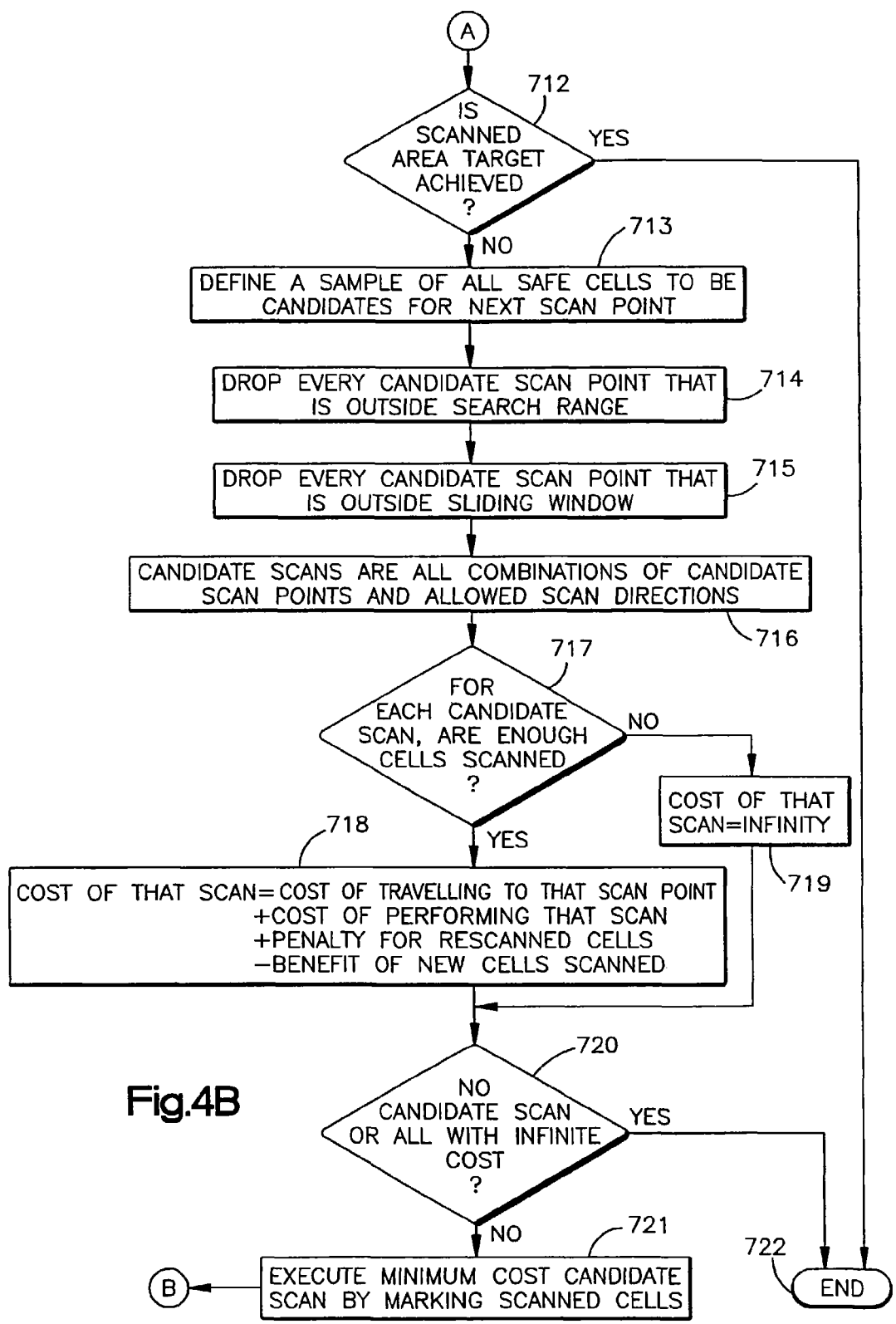

FIGS. 4A and 4B are a flow diagram illustrating the manner in which a computer may be programmed to perform various functions of the algorithm described herein. Step 701 starts the algorithm. Following step 701, the algorithm advances to step 702. In step 702, the computer initializes the environment in which the algorithm will operate, such as initializing a particular software program and reading the geography of the cell grid 100. Following step 702, the algorithm advances to step 703. In step 703, the computer reads the predetermined terrain information (i.e., average elevation of each cell) and MapCost values of the cell grid 100. Following step 703, the algorithm advances to step 704. In step 704, the computer initializes all grid cells as unscanned, unsafe, not on a boundary, and not on a safe frontier. Following step 704, the algorithm advances to step 705. In step 705, the computer determines and initializes ridge cells of the cell grid 100. Following step 705, the algorithm advances to step 706. In step 706, the computer initially marks grid cells in the leftmost (in FIG. 1) three columns as scanned and safe. These cells may be marked by setting a flag for each cell in the three columns.

Following step 706, the algorithm advances to step 707. In step 707, the computer sets the starting point (starting cell) of the entity 200 to be the vertically (in FIG. 1) middle cell in the second column from the left. Following step 707, the algorithm advances to step 708. In step 708, every grid cell, where that grid cell and the eight immediate neighbors of that grid cell are scanned (including cells scanned for the first time) are marked by the computer as being safe. Following step 708, the algorithm advances to step 709. In step 709, the computer marks all scanned grid cells that are adjacent an unscanned cell as being a boundary cell. Following step 709, the algorithm advances to step 710. In step 710, the computer marks all grid cells that are safe and adjacent a boundary cell as being on a safe frontier. Following step 710, the algorithm advances to step 711. In step 711, the computer calculates and stores the value of the percentage area scanned. Following step 711, the algorithm advances to step 712. In step 712 the computer compares the percentage area scanned to predetermined target coverage. If the percentage area scanned is greater than or equal to the predetermined target coverage, the computer ends the algorithm at step 722. If the percentage area scanned is less than the predetermined target coverage, the computer continues the algorithm at step 713.

In step 713, the computer defines a sample (i.e., as determined by the SparsenessFactor) of all safe cells to be candidates for the next scan point. Following step 713, the algorithm advances to step 714. In step 714, the computer drops each candidate next scan point that is outside the scan radius 401 of the sensor as determined by the parameter CircularSearchBound. Following step 714, the algorithm advances to step 715. In step 715, the computer drops each candidate next scan point that is outside the sliding window determined by the parameter BackwardSearchBound. Following step 715, the algorithm advances to step 716. In step 716, the computer defines candidate scans to be all combinations of candidate scan points and allowed scan directions. Following step 716, the algorithm advances to step 717. In step 717, for each candidate scan, the computer determines whether the number of cells scanned is enough (greater than or equal to a predetermined amount) to conduct a cost analysis for moving the entity 200 to that scan point. For that candidate scan, if the number of scanned cells is large enough, the algorithm advances to step 718. In step 718, the computer conducts a cost analysis, as described above. Following step 718, the algorithm advances to step 720. If the number of scanned cells is not large enough for that candidate scan, the algorithm advances to step 719. In step 719, the computer sets the cost at infinity. Following step 719, the algorithm advances to step 720.

In step 720, if no candidate scans remain or the cost for all candidate scans is infinity, the computer advances to step 722 and ends the algorithm. In step 721, the computer determines the candidate next scan with the minimum cost, executes the minimum cost candidate scan from the appropriate cell, sets that cell as the starting cell 501, and restarts the algorithm by advancing to step 708.

In accordance with another aspect of the present invention, a computer program product may utilize the above described algorithm for determining a route for a entity 200 through a predetermined area and for analyzing the content of the predetermined area. The product may include eight procedures. These procedures may be integrated in a single computer or performed by separate, linked computers. The first procedure partitions the predetermined area into cells. The second procedure determines a starting cell for the entity. The third procedure initiates a scan from the starting cell and determines the content of each of the cells scanned by the third procedure. The fourth procedure determines a travel cost for the entity to travel to each of the scanned cells and a scan cost for performing a scan from each of the scanned cells. The fifth procedure adds the travel cost and scan cost of each cell to produce a total cost for each cell. The sixth procedure determines a next scan with a minimum total cost. The seventh procedure initiates a signal to move the entity to the next scan cell. The eighth procedure redesignates the next scan cell as the starting cell and returns to the third procedure.

In accordance with still another aspect of the present invention, a computer program product may utilize the above described algorithm for routing an entity 200 through a predetermined area and for scanning the content of the predetermined area thereby analyzing the content of the predetermined area. The computer program product includes a computer readable medium located on the entity 200 and a computer program stored by the computer readable medium. The computer readable medium may be part of a computer or microcomputer such as a personal computer or a programmable microcontroller.

The computer program may include the following instructions: a first instruction for partitioning the predetermined area into cells; a second instruction for determining a starting cell for the entity 200; a third instruction for initiating a scan, from the starting cell, of a number of the cells and determining the content of each of the number of cells; a fourth instruction for determining a total cost for the entity to travel to each of the scanned cells and for performing a scan from each of the scanned cells; and a fifth instruction for determining the next scan with a minimum total cost.

Although the invention has been described in conjunction with the preferred embodiments, it is to be appreciated that various modifications may be made without departing from the spirit and scope of the invention as defined by the appended claims.

Having described the invention, we claim:

1. A system for scanning a target portion of a predefined search area, said system comprising:
 a sensor for scanning a first part of the predefined search area from a starting point; and
 a device for analyzing output from said sensor and determining a destination point within the predefined search area for said sensor,
 said sensor scanning a second part of the predefined search area from the destination point, the first part and the second part together comprising a part of the predefined search area at least as large as the target portion of the predefined search area.

2. The system as set forth in claim 1 wherein said device is a computer.

3. The system as set forth in claim 1 wherein said device partitions the predefined search area into cells, said device determining a starting cell for the sensor.

4. The system as set forth in claim 3 wherein said device initiates a scan of a number of the cells from the starting cell, said sensor determining the content of each of the number of cells.

5. The system as set forth in claim 4 wherein said device determines a total cost for said sensor to travel to each of the scanned cells, said sensor performing a scan from each of the scanned cells.

6. The system as set forth in claim 5 wherein said device determines a next scan cell with a minimum cost.

7. The system as set forth in claim 6 wherein said device redesignates the next scan cell as the starting cell.

* * * * *